US008271138B2

(12) United States Patent
Eliuk et al.

(10) Patent No.: US 8,271,138 B2
(45) Date of Patent: Sep. 18, 2012

(54) GRIPPER DEVICE

(75) Inventors: Walter W. Eliuk, Winnipeg (CA); Ronald H. Rob, Dugald (CA); Richard L. Jones, Winnipeg (CA); Dustin Deck, St. Andrews (CA)

(73) Assignee: Intelligent Hospital Systems Ltd., Winnipeg (CA)

( * ) Notice: Subject to any disclaimer, the term of this patent is extended or adjusted under 35 U.S.C. 154(b) by 1042 days.

(21) Appl. No.: 12/209,097

(22) Filed: Sep. 11, 2008

(65) Prior Publication Data

US 2009/0067973 A1 Mar. 12, 2009

Related U.S. Application Data

(60) Provisional application No. 60/971,815, filed on Sep. 12, 2007, provisional application No. 60/988,660, filed on Nov. 16, 2007.

(51) Int. Cl.
*G05B 15/00* (2006.01)

(52) U.S. Cl. ........ 700/260; 700/235; 700/245; 700/258; 294/902

(58) Field of Classification Search ........................ None
See application file for complete search history.

(56) References Cited

U.S. PATENT DOCUMENTS

| | | | | |
|---|---|---|---|---|
| 2,988,984 | A | | 6/1961 | Eckert et al. |
| 3,002,387 | A | | 10/1961 | Micheletti |
| 3,556,342 | A | | 1/1971 | Guarr |
| 3,878,967 | A | | 4/1975 | Joslin et al. |
| 3,880,211 | A | | 4/1975 | Gess et al. |
| 3,965,945 | A | | 6/1976 | Ross |
| 4,058,121 | A | | 11/1977 | Choksi et al. |
| 4,372,464 | A | | 2/1983 | Otten |
| 4,464,336 | A | | 8/1984 | Hiramoto |
| 4,634,424 | A | | 1/1987 | O'Boyle |
| 4,648,430 | A | | 3/1987 | Di Gianfilippo et al. |
| 4,669,599 | A | | 6/1987 | Dijkmeijer et al. |
| 4,695,963 | A | * | 9/1987 | Sagisawa et al. ............ 700/258 |
| 4,699,186 | A | | 10/1987 | Palin et al. |
| 4,706,207 | A | | 11/1987 | Hennessy et al. |
| 4,730,435 | A | | 3/1988 | Riddle et al. |
| 4,766,389 | A | * | 8/1988 | Rhoades et al. ............. 324/662 |
| 4,811,764 | A | | 3/1989 | McLaughlin |
| 4,829,524 | A | | 5/1989 | Yoshida |
| 4,835,372 | A | | 5/1989 | Gombrich et al. |

(Continued)

FOREIGN PATENT DOCUMENTS

CA 1317262 9/1999

(Continued)

OTHER PUBLICATIONS

EPO Extended European Search Report for EP Application No. 06751430.7 (PCT/US2006/015731), mailed Sep. 14, 2009, 7 pages.

(Continued)

*Primary Examiner* — Khoi Tran
*Assistant Examiner* — Jonathan L Sample
(74) *Attorney, Agent, or Firm* — Oblon, Spivak, McClelland, Maier & Neustadt, L.L.P.

(57) ABSTRACT

Gripper devices for handling syringes and automated pharmacy admixture systems (APASs) that utilize such gripper devices. The gripper devices may include various gripper finger profiles, substantially tapered or angled gripping surfaces and/or gripper fingers interleaving to reduce radial distortion of the syringes to be grasped while opposing axial motion of the syringes.

26 Claims, 8 Drawing Sheets

U.S. PATENT DOCUMENTS 4,835,707 A 5/1989 Amano et al.
4,842,028 A 6/1989 Kaufman et al.
4,847,764 A 7/1989 Halvorson
4,861,335 A 8/1989 Reynolds
4,871,559 A 10/1989 Dunn et al.
4,878,705 A * 11/1989 Arnquist ....................... 294/116
4,910,942 A 3/1990 Dunn et al.
4,918,604 A 4/1990 Baum
4,993,598 A 2/1991 Groninger
5,004,962 A 4/1991 Fonss et al.
5,020,958 A 6/1991 Tuttobene
5,034,235 A 7/1991 Dunn et al.
5,122,342 A 6/1992 McCulloch et al.
5,144,146 A 9/1992 Wekhof
5,169,642 A 12/1992 Brinker et al.
5,203,385 A 4/1993 Waber
5,208,762 A 5/1993 Charhut et al.
5,229,074 A 7/1993 Heath et al.
5,267,174 A 11/1993 Kaufman et al.
5,288,285 A 2/1994 Carter
5,309,959 A 5/1994 Shaw et al.
5,319,543 A 6/1994 Wilhelm
5,324,519 A 6/1994 Dunn et al.
5,337,919 A 8/1994 Spaulding et al.
5,339,421 A 8/1994 Housel, III
5,341,854 A * 8/1994 Zezulka et al. ................... 141/1
5,348,585 A 9/1994 Weston
5,363,885 A 11/1994 McConnell et al.
5,366,896 A 11/1994 Margrey et al.
5,411,489 A 5/1995 Pagay et al.
5,431,201 A * 7/1995 Torchia et al. .................. 141/98
5,451,528 A 9/1995 Raymoure et al.
5,479,969 A * 1/1996 Hardie et al. ................. 141/130
5,502,944 A 4/1996 Kraft et al.
5,522,512 A 6/1996 Archer et al.
5,522,804 A 6/1996 Lynn
5,533,606 A 7/1996 Yuyama
5,534,222 A 7/1996 Kelbrick et al.
5,597,995 A 1/1997 Williams et al.
5,611,051 A 3/1997 Pirelli
5,635,394 A 6/1997 Horn
5,660,305 A 8/1997 Lasher et al.
5,666,410 A 9/1997 McLane
5,680,858 A 10/1997 Hansen et al.
5,700,998 A 12/1997 Palti
5,713,485 A 2/1998 Liff et al.
5,713,487 A 2/1998 Coughlin
5,744,094 A 4/1998 Castberg et al.
5,768,853 A 6/1998 Bushnell et al.
5,769,086 A 6/1998 Ritchart et al.
5,786,598 A 7/1998 Clark et al.
5,797,515 A 8/1998 Liff et al.
5,798,020 A 8/1998 Coughlin
5,805,454 A 9/1998 Valerino, Sr. et al.
5,812,410 A 9/1998 Lion et al.
5,832,447 A 11/1998 Rieker et al.
5,839,836 A 11/1998 Yuyama et al.
5,848,593 A 12/1998 McGrady et al.
5,884,273 A 3/1999 Sattizahn et al.
5,884,457 A 3/1999 Ortiz et al.
5,895,019 A 4/1999 Ibarra
5,900,211 A 5/1999 Dunn et al.
5,907,493 A 5/1999 Boyer et al.
5,911,252 A 6/1999 Cassel
5,912,818 A 6/1999 McGrady et al.
5,948,360 A 9/1999 Rao et al.
5,963,641 A 10/1999 Crandall et al.
5,971,593 A 10/1999 McGrady
5,993,046 A 11/1999 McGrady et al.
6,006,946 A 12/1999 Williams et al.
6,013,918 A 1/2000 Bushnell et al.
6,037,598 A 3/2000 Cicha
6,048,086 A 4/2000 Valerino et al.
6,060,022 A 5/2000 Pang et al.
6,068,156 A 5/2000 Liff et al.
6,082,987 A 7/2000 Su et al.
6,096,561 A 8/2000 Tayi
6,108,588 A 8/2000 McGrady
6,141,412 A 10/2000 Smith et al.
6,155,485 A 12/2000 Coughlin et al.
6,161,141 A 12/2000 Dillon
6,181,979 B1 1/2001 Murakami
6,181,982 B1 1/2001 Yuyama et al.
6,200,289 B1 3/2001 Hochman et al.
6,202,004 B1 3/2001 Valerino, Sr.
6,202,923 B1 3/2001 Boyer et al.
6,203,535 B1 3/2001 Barney et al.
6,249,717 B1 6/2001 Nicholson et al.
6,249,774 B1 6/2001 Roden et al.
6,279,724 B1 8/2001 Davis
6,318,630 B1 11/2001 Coughlin et al.
6,343,690 B1 * 2/2002 Britton et al. ............ 198/867.06
6,355,024 B1 3/2002 Small et al.
6,360,794 B1 3/2002 Turner
6,370,841 B1 4/2002 Chudy et al.
6,374,982 B1 * 4/2002 Cohen et al. ............... 198/346.2
RE37,829 E 9/2002 Charhut et al.
6,461,568 B1 10/2002 Eckhardt
6,470,234 B1 10/2002 McGrady
6,477,442 B1 11/2002 Valerino, Sr.
6,482,176 B1 11/2002 Wich
6,564,121 B1 5/2003 Wallace et al.
6,566,659 B1 5/2003 Clark et al.
6,592,816 B1 7/2003 Ebel et al.
6,599,476 B1 7/2003 Watson et al.
6,604,903 B2 8/2003 Osborne et al.
6,616,771 B2 9/2003 Osborne et al.
6,623,455 B2 9/2003 Small et al.
6,673,048 B1 1/2004 Duchon et al.
6,722,404 B2 4/2004 Osborne
6,735,497 B2 5/2004 Wallace et al.
6,832,844 B2 * 12/2004 Guzorek ....................... 362/263
6,847,861 B2 1/2005 Lunak et al.
6,877,530 B2 4/2005 Osborne et al.
6,883,681 B1 4/2005 Coughlin et al.
6,915,823 B2 7/2005 Osborne et al.
6,975,924 B2 12/2005 Kircher et al.
6,976,349 B2 12/2005 Baldwin et al.
6,985,870 B2 1/2006 Martucci et al.
6,986,234 B2 1/2006 Liedtke
6,991,002 B2 1/2006 Osborne et al.
7,007,443 B2 3/2006 Liedtke et al.
7,100,792 B2 9/2006 Hunter et al.
7,108,679 B2 9/2006 Alchas
7,117,902 B2 10/2006 Osborne
7,260,447 B2 8/2007 Osborne et al.
7,278,813 B2 10/2007 Davis et al.
7,403,901 B1 7/2008 Carley et al.
7,630,788 B1 12/2009 Reese
2001/0018937 A1 9/2001 Nemoto
2002/0020459 A1 2/2002 Baldwin et al.
2002/0035412 A1 3/2002 Kircher et al.
2002/0146343 A1 10/2002 Jenkins et al.
2002/0198738 A1 12/2002 Osborne
2003/0046114 A1 3/2003 Davies et al.
2003/0097368 A1 5/2003 Tribble et al.
2003/0216831 A1 11/2003 Hart et al.
2004/0028553 A1 2/2004 Panico
2004/0034447 A1 * 2/2004 Vollm ........................... 700/235
2004/0099869 A1 5/2004 Gaska et al.
2004/0104243 A1 6/2004 Osborne et al.
2004/0123567 A1 7/2004 McErlean et al.
2004/0154690 A1 8/2004 Osborne et al.
2004/0193317 A1 9/2004 Lunak et al.
2004/0241041 A1 12/2004 Woodworth et al.
2004/0249498 A1 12/2004 William et al.
2004/0250842 A1 12/2004 Adams et al.
2005/0045242 A1 3/2005 Osborne
2005/0133729 A1 6/2005 Woodworth et al.
2005/0224137 A1 10/2005 Tribble et al.
2005/0236579 A1 10/2005 Jenkins et al.
2005/0252572 A1 11/2005 Khan et al.
2005/0252574 A1 11/2005 Khan et al.
2005/0279419 A1 * 12/2005 Tribble et al. ................... 141/27
2006/0136095 A1 6/2006 Rob et al.
2006/0224414 A1 10/2006 Astrup et al.
2006/0225383 A1 10/2006 Cobb et al.

| | | | | |
|---|---|---|---|---|
| 2006/0259195 | A1 | 11/2006 | Eliuk et al. | |
| 2007/0014656 | A1* | 1/2007 | Harris et al. | 414/744.5 |
| 2008/0114328 | A1 | 5/2008 | Doherty et al. | |
| 2008/0199353 | A1 | 8/2008 | Mlodzinski et al. | |
| 2009/0067973 | A1 | 3/2009 | Eliuk et al. | |
| 2009/0138340 | A1 | 5/2009 | Borr et al. | |
| 2010/0017031 | A1 | 1/2010 | Rob et al. | |

FOREIGN PATENT DOCUMENTS

| | | |
|---|---|---|
| DE | 4 314 657 | 11/1994 |
| WO | 90/09776 | 9/1990 |
| WO | 94/04415 | 3/1994 |
| WO | 95/15142 | 6/1995 |
| WO | 97/43915 | 11/1997 |
| WO | 99/29412 | 6/1999 |
| WO | 99/29415 | 6/1999 |
| WO | 99/29467 | 6/1999 |
| WO | 00/16213 | 3/2000 |
| WO | 2006/069361 | 6/2006 |
| WO | WO 2006/124211 | 11/2006 |
| WO | WO 2008/058280 | 5/2008 |
| WO | WO 2008/101353 | 6/2008 |
| WO | WO 2009/033283 | 3/2009 |
| WO | WO2009/062316 | 5/2009 |

OTHER PUBLICATIONS

Office Action in Re Exam Control No. 95/000,335; mailed Oct. 1, 2009 27 pages.
Re Exam Notification re Brief, Control No. 95/000,334; mailed Sep. 29, 2009 7 pages.
Re Exam Right of Appeal Notice, Control No. 95/000,333; mailed Dec. 2, 2009.
International Preliminary Report on Patentabililty, PCT/CA2008/000348, dated Sep. 3, 2009, 10 pages.
International Search Report and Written Opinion, PCT/CA2008/000348 dated Jun. 3, 2008, 10 pages.
Office Action in U.S. Appl. No. 11/316,795 notification date Dec. 29, 2008, 16 pages.
Office Action in U.S. Appl. No. 11/389,995 notification date Apr. 28, 2009, 8 pages.
Patent Owners Entry in Reexam Control No. 95/000,333; filed Jan. 22, 2010; 32 pages.
Interview Summary in U.S. Appl. No. 11/316,795 notification date Feb. 24, 2009; 4 pages.
Reply to office action in U.S. Appl. No. 11/316,795 notification date Mar. 27, 2009; 14 pages.
Notice of Allowance in U.S. Appl. No. 11/316,795 mailing date Jun. 22, 2009; 6 pages.
Interview Summary in U.S. Appl. No. 11/389,995 notification date Jun. 17, 2009; 4 pages.
Reply to office action in U.S. Appl. No. 11/389,995 notification date Sep. 15, 2009; 14 pages.
Express Withdrawal of Appeal in Reexam control No. 95000334; filed Oct. 29, 2009; 4 pages.
Patent Owner Petition in Reexam control No. 95/000334; filed Nov. 10, 2009; 8 pages.
U.S. Appl. No. 60/865,105, filed Nov. 9, 2006.
U.S. Appl. No. 60/891,433, filed Feb. 23, 2007.
U.S. Appl. No. 60/971,815, filed Sep. 12, 2007.
U.S. Appl. No. 11/316,795, filed Dec. 22, 2005.
U.S. Appl. No. 11/389,995, filed Mar. 27, 2006.
"Aseptic Technique Process and End-product Evaluation," Department of Pharmacy Policy, 1994, University of Kentucky Hospital, Chandler Medical Center, 4 pages.
"Industrial Automated Pulsed UV Modules," Advanced Pulsed UV and Corona Systems from SteriBeam GmbH, Kehl, Germany, http://www.steribeam.com/f-scale.puv, printed Jan. 25, 2008, 1 page.
"Two UV-flashlamps R&D/Labor Automated System," Advanced Pulsed UV and Corona Systems From SteriBeam GmbH, Kehl, Germany, http://www.steribeam.com/xe-labor-wt.html, printed Mar. 24, 2006, 2 pages.
"BD Helping all people live health lives Prefilled. Proven. Preferred.," BD Product Literature, BD, 2000.
Biomedical Technology Consulting, "05BTC—Cytocare: Automatic system for the preparation of cytostatic drugs," pp. 1-22 with translation; downloaded from Internet site www.tecnomedical.com on Aug. 14, 2006.
Cote and Torchia, "Robotic system for i.v. antineoplastic drug preparation: Description and preliminary evaluation under simulated conditions" Am. J. Hosp. Pharm., 1989, 46:2286-2293.
U.S. Appl. No. 12/035,850, filed Feb. 22, 2008.
U.S. Appl. No. 11/937,846, filed Nov. 9, 2007.
Wekhof et al., "Pulsed UV Disintegration (PUVD): a new sterilization mechanism for packaging and broad medical-hospital applications," The First International Conference on Ultraviolet Technologies, Jun. 14-16, 2001, Washington, D.C., 15 pages.
Wekhof, "Basic Definitions and Data for Electron Beam Sterilization," SteriBeam Systems, GmbH, 2005, 2 pages.
Wekhof, "Disinfection with Flash Lamps," PDA Journal of Pharmaceutical Science & Technology, 2000, 54(3):264-276.
Wekhof, "Does the Engineering of the PureBright Sterilisation System Match the Pulsed Light Sterilisation Process?" Advanced Ultra-Fast Sterilisation from SteriBeam Systems GmbH, Kehl, Germany, 2001, http://www.steribeam.com/articles/WTPP-Rep/html, 6 pages.
"Welcome to the Future. The Robotic IV Admixture System: The established wave of the future with real bottom line savings." Robotic IV Admixture System; Canada, 1992.
Definition of cannula1', Webster's Third New International Dictionary, Unabridged. Copyright 1993 Merriam-Webster, Incorporated.
Kohler, et al. "Standardizing the expression and nomenclature of cancer treatment regiments". Am J Health-Svst Pharm: 1998; 55: 137-144.
"Dose Systems." Pharmaceutical Journal; pp. 757, vol. 254, No. 6843; Jun. 3, 1995.
International Search Report, PCT/US2005/046978 dated Aug. 2, 2006, 6 pages.
The Written Opinion, PCT/US2005/046978 date mailed Aug. 2, 2006, 10 pages.
International Search Report and Written Opinion in PCT/US06/15731, mailed Jul. 29, 2008, 10 pages.
International Search Report and Written Opinion, PCT/CA2008/001613 dated Sep. 12, 2008, 10 pages.
International Search Report and Written Opinion, PCT/US07/84332 dated Jul. 1, 2008, 11 pages.
Office Action in Re Exam Control No. 95/000,333; mailed Mar. 7, 2008; 36 pages.
Office Action in Re Exam Control No. 95/000,334; mailed Feb. 27, 2008; 17 pages.
Office Action in Re Exam Control No. 95/000,335; mailed Mar. 7, 2008; 31 pages.
Office Action in Re Exam Control No. 95/000,336; mailed Mar. 11, 2008; 36 pages.
Office Action in Re Exam Control No. 95/000,340; mailed Mar. 21, 2008; 43 pages.
Office Action in Re Exam Control No. 95/000,342; mailed Mar. 11, 2008; 18 pages.
Office Action in Re Exam Control No. 95/000,342; mailed Oct. 15, 2008; 28 pages.
Office Action in Re Exam Control No. 95/000,345; mailed Apr. 23, 2008; 110 pages.
Patent Owner's Response in Re Exam Control No. 95/000,333; filed Jun. 12, 2008, 11 pages.
Patent Owner's Response in Re Exam Control No. 95/000,333; filed Jun. 7, 2008, 38 pages.
Patent Owner's Response in Re Exam Control No. 95/000,335; filed Jun. 7, 2008, 34 pages.
Patent Owner's Response in Re Exam Control No. 95/000,336 filed Nov. 14, 2008, 35 pages.
Patent Owner's Response in Re Exam Control No. 95/000,336; filed Jun. 12, 2008, 13 pages.
Patent Owner's Response in Re Exam Control No. 95/000,336; filed Jun. 7, 2008, 44 pages.
Patent Owner's Response in Re Exam Control No. 95/000,340; filed Jun. 12, 2008, 10 pages.
Patent Owner's Response in Re Exam Control No. 95/000,340; filed May 20, 2008, 39 pages.

Patent Owner's Response in Re Exam Control No. 95/000,342; filed Jun. 7, 2008, 33 pages.
Patent Owner's Response in Re Exam Control No. 95/000,342; filed Nov. 13, 2008, 14 pages.
Patent Owner's Response in Re Exam Control No. 95/000,345; filed Jun. 23, 2008, 32 pages.
Request for InterPartes Reexamination in Reexam Control No. 95/000,333; filed Jan. 11, 2008; 39 pages.
Request for InterPartes Reexamination in Reexam Control No. 95/000,334; filed Jan. 11, 2008; 54 pages.
Request for InterPartes Reexamination in Reexam Control No. 95/000,335; filed Jan. 11, 2008; 73 pages.
Request for InterPartes Reexamination in Reexam Control No. 95/000,336; filed Jan. 11, 2008; 97 pages.
Request for InterPartes Reexamination in Reexam Control No. 95/000,340; filed Jan. 30, 2008; 33 pages.
Request for InterPartes Reexamination in Reexam Control No. 95/000,342; filed Feb. 1, 2008; 27 pages.
Request for InterPartes Reexamination in Reexam Control No. 95/000,345; filed Feb. 11, 2008; 32 pages.
Third Party Comments on Patent Owner Response in Reexam Control No. 95/000,333; filed Jul. 7, 2008; 29 pages.
Third Party Comments on Patent Owner Response in Reexam Control No. 95/000,335; filed Jul. 7, 2008; 18 pages.
Third Party Comments on Patent Owner Response in Reexam Control No. 95/000,336; filed Dec. 15, 2008; 7 pages.
Third Party Comments on Patent Owner Response in Reexam Control No. 95/000,336; filed Jul. 7, 2008; 22 pages.
Third Party Comments on Patent Owner Response in Reexam Control No. 95/000,340; filed Jun. 19, 2008; 19 pages.
Third Party Comments on Patent Owner Response in Reexam Control No. 95/000,342; filed Dec. 15, 2008; 7 pages.
Third Party Comments on Patent Owner Response in Reexam Control No. 95/000,342; filed Jul. 7, 2008; 28 pages.
Third Party Comments on Patent Owner Response in Reexam Control No. 95/000,345; filed Jul. 23, 2008; 16 pages.
Reply to Office Action in European Application serial No. 05855521.0, filed Jan. 8, 2010, pp. 15.
International Search Report and Written Opinion, PCT/CA2008/002027 dated Feb. 25, 2009, 12 pages.
Office Action in Re Exam Control No. 95/000,333; mailed May 5, 2009; 43 pages.
Office Action in Re Exam Control No. 95/000,336; mailed Oct. 15, 2008; 21 pages.
Office Action in Re Exam Control No. 95/000,340; mailed Mar. 30, 2009; 69 pages.
Office Action in Re Exam Control No. 95/000,345; mailed Mar. 30, 2009; 67 pages.
Patent Owner's Response in Re Exam Control No. 95/000,333; filed Jun. 16, 2009, 16 pages.
Patent Owner's Response in Re Exam Control No. 95/000,345; filed Apr. 29, 2009, 8 pages.
Third Party Comments on Patent Owner Response in Reexam Control No. 95/000,333; filed Jul. 16, 2009; 11 pages.
Office Action in Re Exam Control No. 95/000,345; mailed Jul. 2, 2009, 73 pages.
Office Action in Re Exam Control No. 95/000,340; mailed Jul. 20, 2009, 8 pages.

* cited by examiner

GRIPPER DEVICE

CROSS REFERENCE TO RELATED APPLICATIONS

This application claims priority under 35 USC §119(e) to U.S. Provisional Patent Application Ser. No. 60/971,815, entitled "Gripper Device," and filed by Eliuk et al. on Sep. 12, 2007. This application is related to U.S. Provisional Patent Application Ser. No. 60/988,660, entitled "Method and Apparatus for Automated Fluid Transfer Operations," and filed by Eliuk et al. on Nov. 16, 2007; U.S. patent application Ser. No. 11/316,795, entitled "Automated Pharmacy Admixture System," and filed by Rob et al. on Dec. 22, 2005; U.S. patent application Ser. No. 11/389,995, entitled "Automated Pharmacy Admixture System," and filed by Eliuk et al. on Mar. 27, 2006.; U.S. patent application Ser. No. 11/937,836, entitled "Control of Fluid Transfer Operations," and filed by Doherty et al. on Nov. 9, 2007; and U.S. patent application Ser. No. 12/035,850, entitled "Ultraviolet Sanitization In Pharmacy Environments," and filed by Reinhardt et al. on Feb. 22, 2008. The entire disclosures of each of the aforementioned documents are incorporated herein by reference.

TECHNICAL FIELD

This disclosure relates to gripper devices for handling medical containers such as syringes, vials, and IV bags.

BACKGROUND

Many medications are delivered to a patient from an intravenous (IV) bag into which a quantity of a medication is introduced. Sometimes, the medication may be an admixture with a diluent. In some cases, the IV bag contains only the medication and diluent. In other cases, the IV bag may also contain a carrier or other material to be infused into the patient simultaneously with the medication. Medication can also be delivered to a patient using a syringe.

Medication is often supplied, for example, in powder form in a medication container or in a vial. A diluent liquid may be supplied for making an admixture with the medication in a separate or diluent container or vial. A pharmacist may mix a certain amount of medication (e.g., which may be in dry form such as a powder) with a particular amount of a diluent according to a prescription. The admixture may then be delivered to a patient.

One function of the pharmacist is to prepare a dispensing container, such as an IV bag or a syringe, that contains a proper amount of diluent and medication according to the prescription for that patient. Some prescriptions (e.g., insulin) may be prepared to suit a large number of certain types of patients (e.g., diabetics). In such cases, a number of similar IV bags containing similar medication can be prepared in a batch, although volumes of each dose may vary, for example. Other prescriptions, such as those involving chemotherapy drugs, may require very accurate and careful control of diluent and medication to satisfy a prescription that is tailored to the needs of an individual patient.

The preparation of a prescription in a syringe or an IV bag may involve, for example, transferring fluids, such as medication or diluent, among vials, syringes, and/or IV bags. IV bags are typically flexible, and may readily change shape as the volume of fluid they contain changes. IV bags, vials, and syringes are commercially available in a range of sizes, shapes, and designs.

SUMMARY

In one aspect, an automated pharmacy admixture system includes a supply of a plurality of different types of medical containers that may include syringes, IV bags, and/or vials. The system also includes a compounding system that is disposed in a substantially aseptic chamber and transfers medicaments between medical containers. The system further includes a robotic manipulator system that transports medical containers within the substantially aseptic chamber. The system additionally includes a gripper device that may handle a syringe having a barrel within the substantially aseptic chamber. The gripper device includes a pair of gripper fingers. Each gripper finger includes a first jaw that has a recess for grasping the syringe barrel. The recess includes a first tapered contact surface that has a leading edge for contacting the syringe barrel. When the gripper fingers are in contact with the syringe barrel, the first tapered contact surface is disposed at an angle with respect to a longitudinal axis of the syringe barrel. The gripper device also includes an actuator for engaging the gripper fingers to grasp the syringe barrel based on inputted or stored motion profile parameters. The gripper fingers provide a ratio of slip force to grip force at least about three times greater than gripper fingers with an untapered contact surface.

In some embodiments, the gripper device is coupled to the robotic manipulator system. In some embodiments, the gripper device is coupled to a syringe manipulator station. The gripper device may be configured to handle different sizes or shapes of syringes.

The tapered contact surface may be curved. In some embodiments, the contact surface is tapered at an angle between about 10 degrees to about 80 degrees. In some embodiments, the contact surface is tapered at an angle between about 30 degrees to about 60 degrees.

The recess may include a second tapered contact surface that has a leading edge for contacting the syringe barrel. When the gripper fingers are in contact with the syringe barrel, the second tapered contact surface is disposed at an angle with respect to the longitudinal axis of the syringe barrel. In some embodiments, the first and second tapered contact surfaces converge approximate at their leading edges. In some embodiments, the first and second tapered contact surfaces converge distal to their leading edges. The recess may include a plurality of tapered contact surfaces that form a saw tooth pattern.

In some embodiments, the gripper fingers provide a ratio of slip force to grip force at least about six times greater than gripper fingers with an untapered contact surface. In some embodiments, the gripper fingers provide a reduction in syringe deformation per unit grip force by at least about 75 percent relative to gripper fingers with an untapered contact surface. In some embodiments, the gripper fingers provide a reduction in syringe deformation per unit grip force by at least about 90 percent relative to gripper fingers with an untapered contact surface.

The gripper fingers may be releasably coupled to the gripper device. In some embodiments, each gripper finger includes a second jaw that has an opposed tapering angle relative to the first jaw. In some embodiments, the jaws are interleaved with one another when the jaws are in operative positions.

The gripper device may include a feedback sensor for measuring grip force. The gripper device may also include a sensor for detecting gripper finger position.

In some embodiments, a pressure in the substantially aseptic chamber is regulated to a pressure level that is substantially above or below ambient pressure. The automated pharmacy admixture system may include a supply of gripper fingers with different configurations for processing different medical containers with different types of medicaments. The system may also include an air handling system for providing substantially laminar air flow within the substantially aseptic chamber. The system may further include a UV sanitization system for sanitizing medical containers.

In another aspect, an automated pharmacy admixture system includes inventory means that supplies a plurality of different types of medical containers that may include syringes, IV bags, and/or vials. The system also includes compounding means disposed in a substantially aseptic chamber that transfers medicaments between medical containers. The system further includes manipulating means that transports medical containers within the substantially aseptic chamber. The system additionally includes gripping means that may handle a syringe having a barrel within the substantially aseptic chamber. The gripping means includes a pair of grasping means that grasp the syringe barrel. Each grasp means includes a tapered contact surface that has a leading edge for contacting the syringe barrel. When the pair of grasping means are in contact with the syringe barrel, the tapered contact surface is disposed at an angle with respect to a longitudinal axis of the syringe barrel. The gripping means also includes actuating means that engages the pair of grasping means to grasp the syringe barrel based on inputted or stored motion profile parameters. The pair of grasping means provide a ratio of slip force to grip force at least about three times greater than a pair of grasping means with an untapered contact surface.

In a further aspect, a gripper device for handling a syringe having a barrel includes a pair of gripper fingers. Each gripper finger includes a first jaw that has a recess for grasping the syringe barrel. The recess includes a first tapered contact surface that has a leading edge for contacting the syringe barrel. When the gripper fingers are in contact with the syringe barrel, the first tapered contact surface is disposed at an angle with respect to a longitudinal axis of the syringe barrel. The gripper device also includes an actuator for engaging the gripper fingers to grasp the syringe barrel based on inputted or stored motion profile parameters. The gripper fingers provide a ratio of slip force to grip force at least about three times greater than gripper fingers with an untapered contact surface.

DESCRIPTION OF DRAWINGS

Like reference symbols in the various drawings indicate like elements.

DETAILED DESCRIPTION

Figure 1:
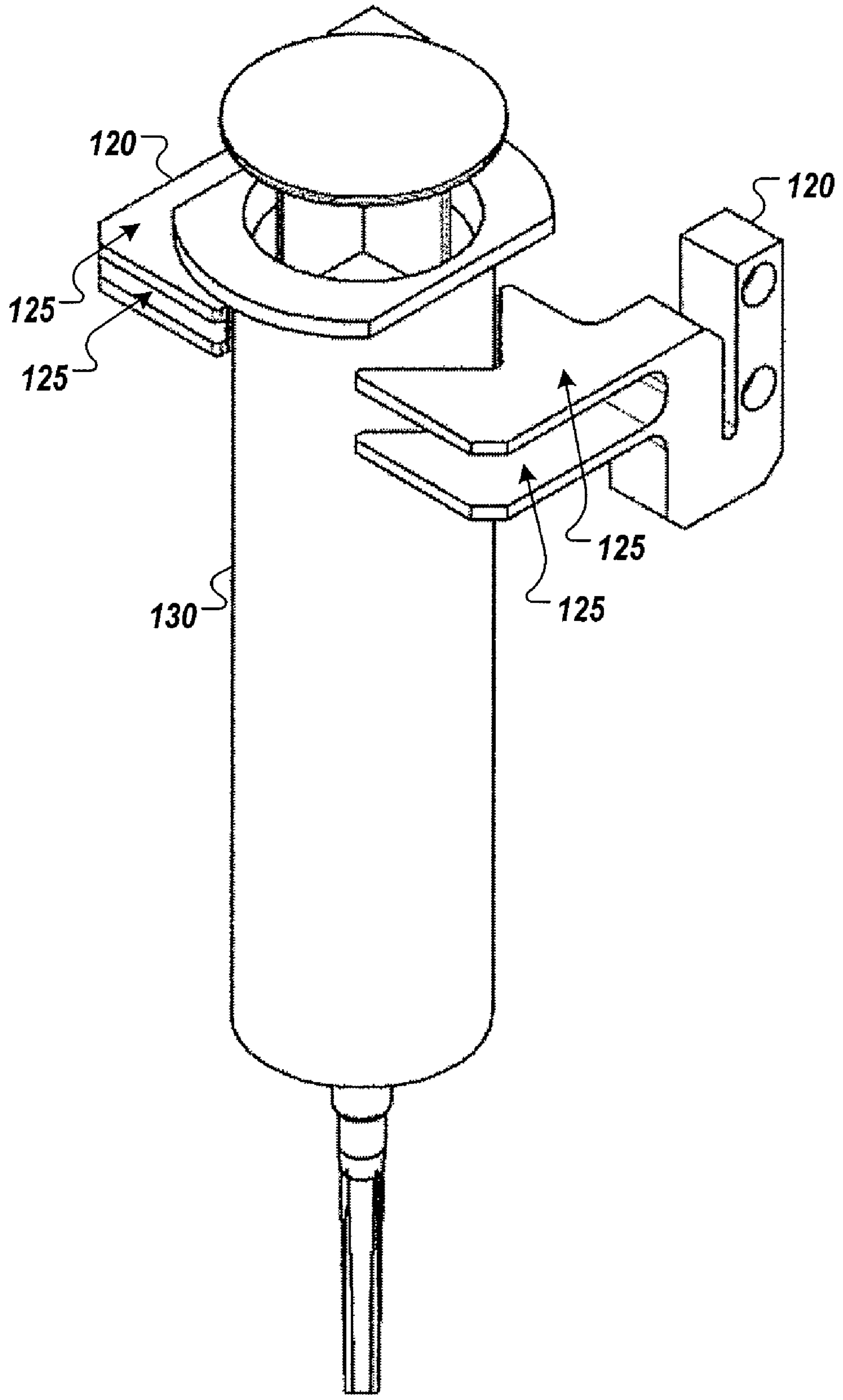
FIG. 1 shows a pair of exemplary gripper fingers that may be used to grasp a syringe.

Disclosed are exemplary systems, methods, and apparatus relating to automated handling and/or manipulation of containers, such as syringes, vials, bottles, packages, or other items, such as IV bags, caps, needles, and the like. Various embodiments may include a gripper device with substantially angled surfaces for providing substantially reduced contact area with an item to be gripped, and improving a ratio of axial retention force to deformation of the item.

In an illustrative example of a syringe manipulator that performs fluid transfer operations, a number of design variables may be considered with respect to use of a gripper device that holds the syringe against movement. The gripper device actuates its gripper fingers to grip a barrel of the body of a syringe to prevent movement of the syringe body while a plunger forces fluid into or out of the barrel. Plunger velocity, and therefore fluid transfer times, are constrained by the force that can be applied to the plunger without causing the barrel to slip through the grip of the gripper fingers. Reduced fluid transfer times can be achieved by increasing the radial (e.g., pinch) force applied to the barrel by the gripper fingers, but increased radial forces tend to deform the walls of the syringe barrel. Deformation of the barrel, in turn, may lead to air or fluid leakage around the plunger which impacts volumetric accuracy, and excessive radial force could damage the syringe.

In an illustrative example, some embodiments of a gripper device that holds a syringe body wall may employ gripper fingers with angled contact surfaces to substantially reduce local deformation of an item being gripped. When grasping a syringe, for example, such local deformation tends to separate a stopper of the plunger from an interior syringe body wall and thus results in fluid and/or air leakage around the plunger stopper. Some embodiments may achieve substantially reduced fluid or air leakage, for example, when performing automated fluid transfer operations with a syringe. Some embodiments may also yield improved resistance to axial slippage of the syringe body with the same or less radial gripping force. In an exemplary automated compounding facility, for example, various embodiments may yield reduced spillage and/or wastage as well as improved volumetric accuracy (e.g., from leaks around a stopper of a syringe plunger), increased throughput (e.g., increased resistance to axial slippage facilitates faster plunger speed and thus reduces fluid transfer times). Some implementations may further provide a gripping device configured to hold an expanded range of container types and/or materials.

Various embodiments may provide one or more advantages. For example, some embodiments may substantially reduce side wall deformation of an item being gripped by one or more opposing pairs of gripper fingers. In some embodiments, reduced deformation may be achieved by shaping the gripper fingers to substantially reduce the contact area between the gripper finger and the item being gripped. In some embodiments, one or more gripper fingers may include a beveled contact surface to bite into a surface of the gripped item so as to oppose motion of the item in at least one axial direction while imparting a substantially reduced radial load (e.g., pinch force), thereby reducing side wall deformation.

In an exemplary embodiment, and without limitation, a gripper mechanism is implemented in an automated pharmacy compounding application, such as an APAS (automated pharmacy admixture system) to grasp syringes used within a cell of a compounding chamber. By way of example, and not limitation, applications for automated container handling include syringe manipulators and robotic transport arms in various embodiments of an APAS system. Examples of APAS systems are described in U.S. patent application Ser. No. 11/316,795, filed by Rob, et al. on Dec. 22, 2005; U.S. patent application Ser. No. 11/389,995, filed by Eliuk, et al. on Mar. 27, 2006; U.S. patent application Ser. No. 11/937,836, filed by Doherty et al. on Nov. 9, 2007; and U.S. patent application Ser. No. 12/035,850, filed by Reinhardt et al. on Feb. 22, 2008, the disclosures of each of which are incorporated herein by reference. Those skilled in the art will understand that various aspects of the gripper device and the gripper fingers may be used to store, hold, convey, and/or orient syringes or other items in connection with the methods and devices (e.g., syringe manipulator, robotic arm) disclosed in the aforementioned applications.

FIG. 1 shows a pair of exemplary gripper fingers 120 that can be implemented on a gripper device (not shown) such as a robotic transport arm or a syringe manipulator. In some embodiments, the gripper fingers are releasably coupled to the gripper device. Each of the exemplary gripper fingers 120 includes a pair of gripping jaws 125. Each of the gripping jaws 125 includes a recess such as a cutout for grasping items, such as a syringe 130. One or more gripper finger actuators (not shown) may be used to engage the gripper fingers 120 with the item to be gripped. In this example, a positive grasp (or hold) of the syringe barrel by the gripper fingers 120 may substantially prevent syringe movement or slippage (e.g., axial, rotational, and/or radial) during subsequent operations. In one exemplary syringe manipulator application, a radial load profile as applied to a syringe body outer wall is modified to substantially reduce syringe body wall deformation while holding the syringe body stationary during fluid transfer operations that include axial forces associated with plunger movement.

Figure 2:
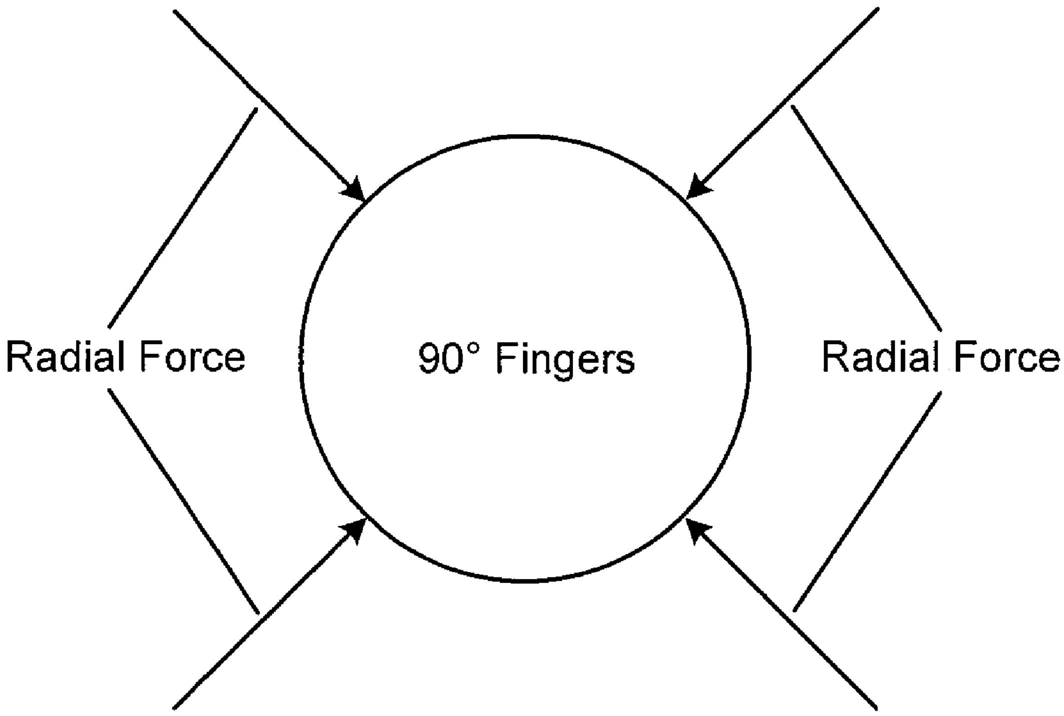
FIG. 2 shows exemplary radial forces that are applied to an item when grasped by the four faces of a pair of gripper fingers with 90 degrees of separation between points of contact with the item.

By way of example and not limitation, deformation of a wall of an item being gripped may be reduced in at least three ways. First, reduced deformation may be achieved by shaping the gripper fingers to substantially reduce the contact area between the gripper fingers and the item being gripped. In some gripping applications (e.g., plastic items), it is expected that a substantially concentrated radial force may yield a reduced deformation. Second, one or more gripper fingers may include a beveled contact surface to bite into a surface of the gripped item so as to oppose motion of the item in at least one axial direction while imparting a substantially reduced radial load (e.g., pinch force). The reduced radial force is believed to yield a corresponding reduction in wall deformation for the item being gripped. Thirdly, the shape of the gripper fingers can be tailored to achieve a desired contact force or area orientation. By changing how the radial force is applied to the item, the deformation shape can be controlled to achieve the desired affect. For example, some embodiments shape the gripper fingers (e.g., such as those depicted in FIG. 1) such that the radial forces are applied at four increments around the circumference of a circular item, as shown in FIG. 2.

In various examples, the increments are substantially equally spaced (e.g., 90 degrees for four contact points), or the increments are differently spaced as a function of size and/or shape of the item to be grasped. In the depicted example, the deformed shape will be different than if the same total force were applied at, for example, by two faces 180° apart (e.g., collinear opposing forces). For example, deformation of the item depicted in FIG. 2 can have a cloverleaf shape (e.g., 4 lobes). It is believed that gripper fingers shapes that more evenly distribute radial force to the item being gripped can substantially reduce a deformation of the item being grasped.

In some embodiments of the gripper fingers, contact surfaces of the gripper fingers engage the item at four localized areas, providing a capability to grip items of various sizes and/or shapes. The number of contact points is not limited to four, as less or more contact points can be provided based on the shape of the item being grasped and the shape of the gripper fingers. In some embodiments, the finger shape may be arranged to provide a substantially complete contact across a width of the gripper fingers and at least a portion of a perimeter of the item being grasped.

Figure 3:
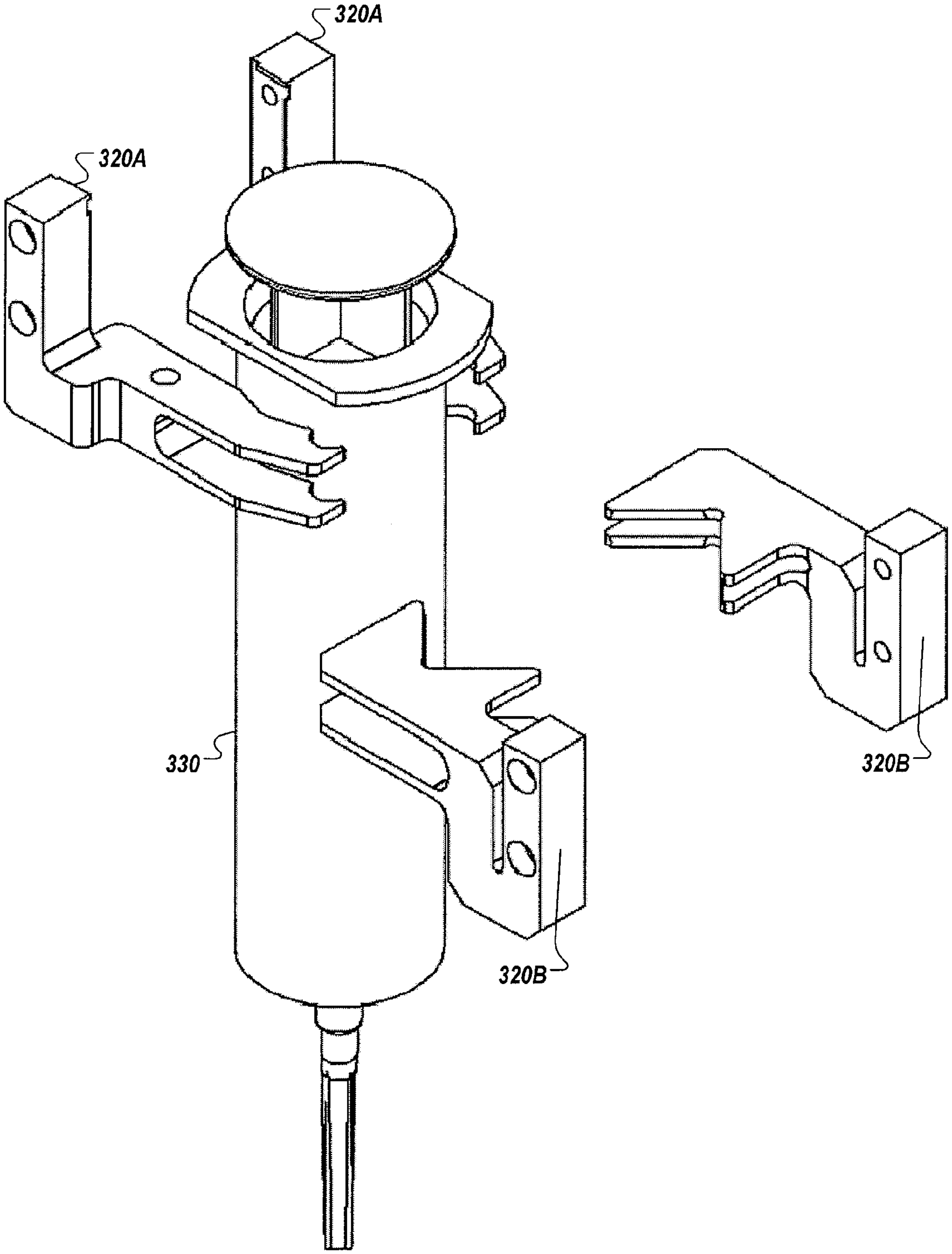
FIG. 3 shows an exemplary operation for transferring a medical container from one pair of gripper fingers to another pair of gripper fingers.

FIG. 3 shows an exemplary transfer operation in which a container (e.g., syringe 330) is handed off from one pair of gripper fingers 320A that may be implemented on one gripper device (not shown) to a second pair of gripper fingers 320B that may be implemented on a second gripper device (not shown). In one example, one gripper device is a robotic arm, and the other gripper device is a syringe manipulator at a fluid transfer station, examples of which are described in the documents incorporated herein by reference (above). In various examples, the item to be grasped is presented to the gripper fingers by various mechanical actuators (e.g., robotic arm, moving carrier system, indexed conveyor). Once the item has been presented to the gripper fingers, one or more gripper finger actuators (not shown) will move one or both of the gripper fingers together to grasp, hold, and/or release the item.

In various embodiments, the gripper fingers as described herein are implemented on a robot (e.g., multi-axis robot) or other mechanical transport or processing apparatus or station. In some examples, a supply of different gripper fingers is available for automated or manual swap-out to provide increased flexibility for processing different containers (e.g., plastic, glass, metallic) and/or process materials (e.g., high viscosity fluids, low viscosity fluids, and the like). For example, a robot transfer arm can access a supply of gripper finger modules to substitute one type of gripper finger design for a different design based on information about materials and process recipes for a compounding operation. A supply of different gripper fingers may be used to selectively attach a selected gripper configuration to various container handling systems, such as a robotic arm, syringe manipulator, agitator, weight scale, or other apparatus, such as a needle remover, syringe barrel capping station, syringe needle decapping station, container labeling stations, storage or parking locations, or the like, examples of which are described in the documents incorporated herein by reference (above).

In various implementations, replaceable gripper fingers or other related components (e.g., including actuation components, such as a motor) may be releasably secured to a gripper device (e.g., robot arm, syringe manipulator, fluid transfer station, or the like) by slipping into slots or rails on the gripper device. Some embodiments use a ball detent mechanism to releasably couple the replaceable fingers to the gripper device by operation of a robotic arm, for example. In another embodiment, the gripper device includes an electromagnet to controllably provide or remove a magnetic field to retain the gripper fingers. In this embodiment, the gripper fingers have a coupling with a high magnetic permeability material (e.g., steel) or permanent magnets to provide a preferred path for the gripper device's magnetic flux, thereby enhancing a reluctance force to hold the gripper fingers in contact with the gripper device. In yet another embodiment, an actuating locking pin positively retains attachment of the gripper fingers to the gripper device until the actuating pin is manipulated to disengage the lock and release the gripper fingers from the gripper device. In still another embodiment, the gripper fingers are threaded onto the gripper device.

In some embodiments, gripper fingers are rotatably coupled to a gripper device (e.g., robot arm) to permit orientation of the gripper fingers when open or closed.

In an illustrative example, an optimization algorithm determines whether and when to swap out gripper fingers from the supply of gripper fingers, selects which gripper finger type to use based on upcoming process operations, and/or adjusts a syringe plunger velocity/force profile to maximize overall throughput for a given load list and to fulfill orders in a compound processing queue.

Figure 4:
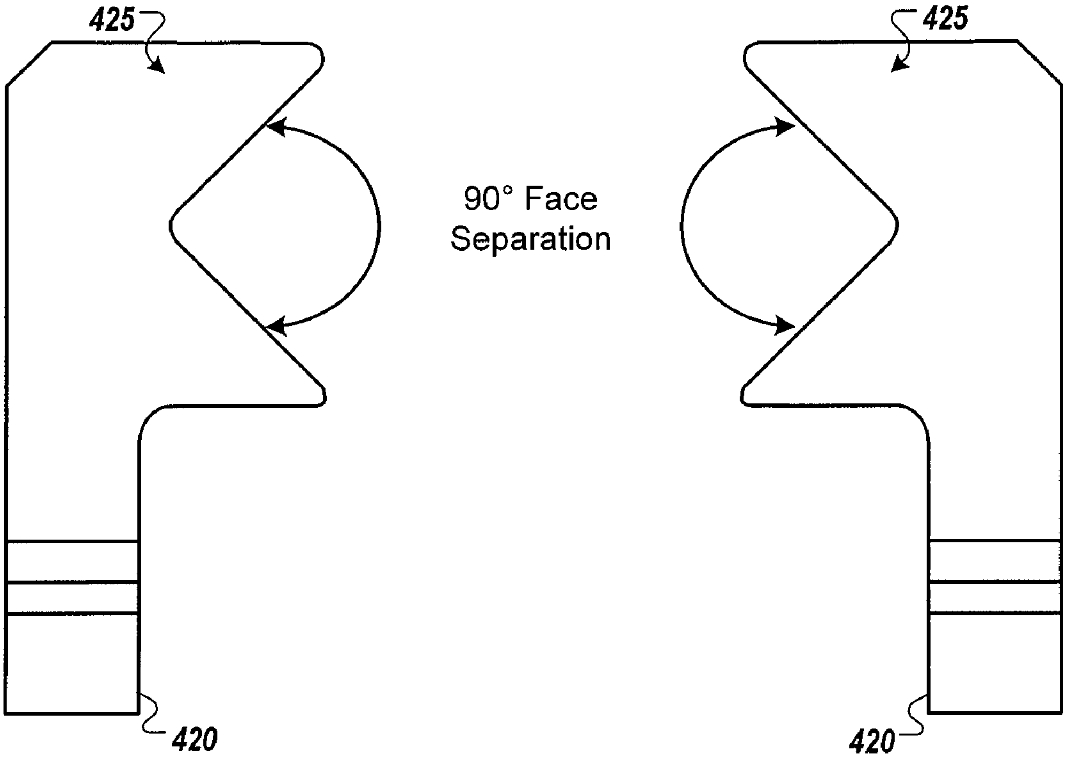
FIG. 4 shows a top view of a pair of exemplary gripper fingers, each gripper finger includes a gripping jaw that includes a recess having two substantially straight faces that are perpendicular to each other.

FIG. 4 shows a top view of a pair of exemplary gripper fingers 420. Each gripper finger 420 includes a gripping jaw 425 for grasping a syringe barrel. Each gripping jaw includes a recess such as a cut-out includes two substantially straight faces 90 degrees perpendicular (in a horizontal plane) to each other. Other embodiments may include, but are not limited to, faces oriented to each other at angles substantially greater than or less than 90 degrees (e.g., about 15, 30, 45, 60, 75, 105, 120, 135, 150, 165 degrees), faces with multiple angles and/or facets, faces with multiple relief cutouts, and gripper finger profiles that are not substantially mirror images of each other. In various embodiments, the angles between faces are, for example between about 85 and about 95 degrees, or between about 75 and about 105 degrees, or between about 45 and about 135 degrees, or between about 30 and about 150 degrees (in the horizontal plane). In some other embodiments, the faces are not substantially straight (e.g., curved or shaped). Some exemplary design features provide a self centering ability, allowing variability in the position of the item prior to grasping, but substantially centering the item in the gripper fingers upon grasping the item.

Figure 5:
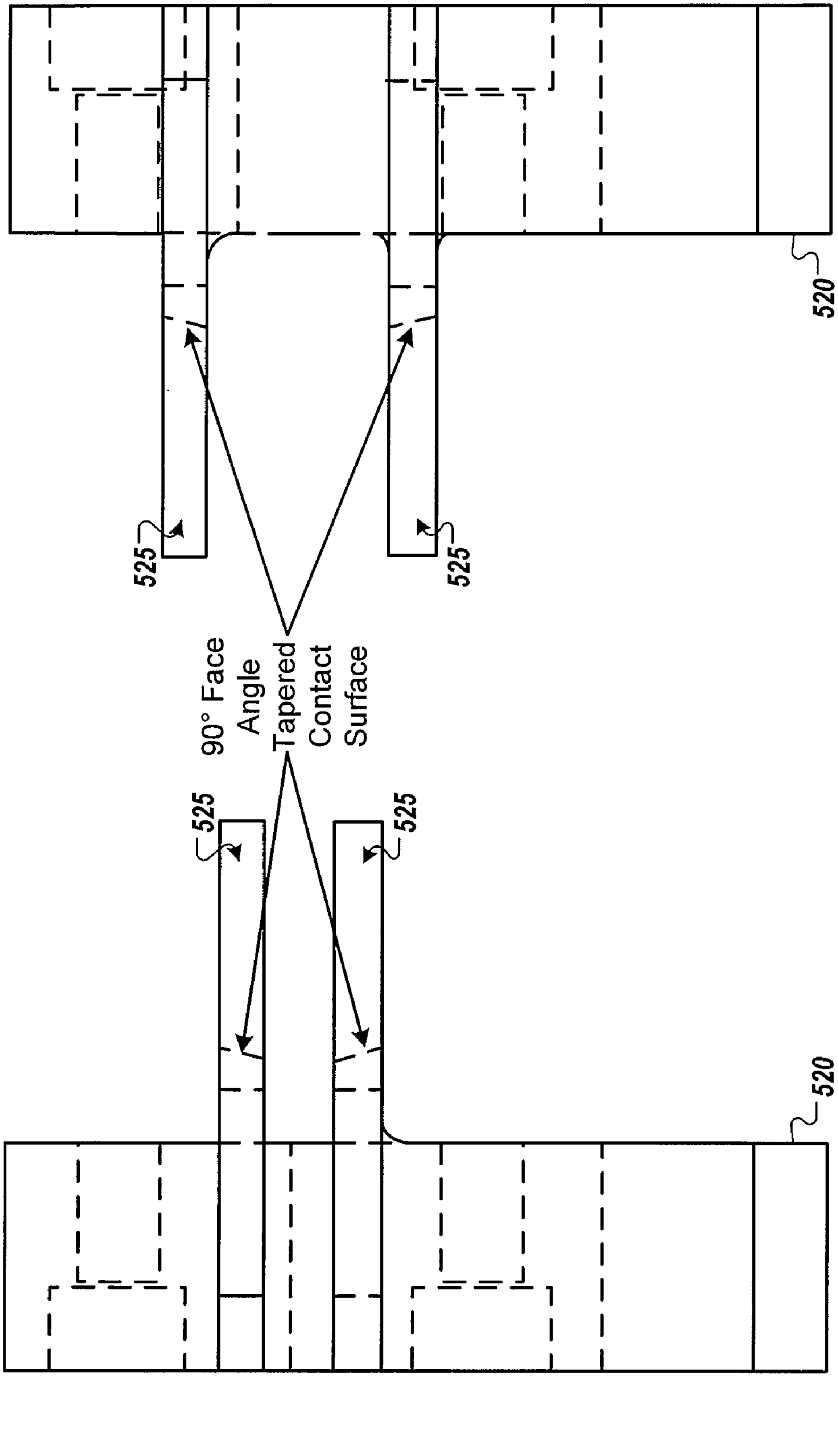
FIG. 5 shows a side cross-section view of a pair of exemplary gripper fingers, each gripper finger includes a pair of gripper jaws having substantially tapered or angled contact surfaces.

FIG. 5 is a side cross-section view of a pair of exemplary gripper fingers 520. Each gripper finger includes a pair of gripping jaws 525 with substantially angled or tapered contact surfaces that have leading edges for providing substantially reduced contact area with an item to be gripped. In this vertically oriented embodiment, gripping faces that can make direct contact with an outer wall of an item, such as a syringe, are substantially angled relative to a vertical direction. The gripping faces depicted in the example of FIG. 5 have a substantial angle applied to them, in this case 10 degrees with respect to vertical (or a tapering angle of 80 degrees). Other embodiments have substantially different angles from vertical, such as at least about +/−1, 2, 5, 8, 10, 20, 45, 60, 70, 80, 85, 87, or about 89 degrees. Such reduced effective area may advantageously improve the effective resistance to slippage in the axial direction, for example, due to force associated with plunger movement when transferring viscous fluid into or out of a barrel of a syringe.

Orientation of the tapering angle of the contact surface may, in some circumstances, have a directional component. It is believe that axial retention force may be, in some gripper finger embodiments, substantially higher in one direction than in the opposite direction. In the exemplary gripper finger configuration of FIG. 5, the top left gripper jaw is believed to have a substantially higher retention force against a downward movement of the item being held compared to a retention force against a corresponding upward movement. Due to the orientation of the angle of the top left contact surface, the tip of the contact surface may effectively bite more into some items if the item is moving downward than if the item is moving upward. Similarly, it is believed that the orientation of the angle of the contact surface on the bottom left gripper jaw may bite more into some items if the item is moving upward than if the item is moving downward.

In the example depicted in FIG. 5, the top and bottom gripping jaws of the left gripper finger have opposing (inverted) angles of the contact surface (with respect to vertical). In the depicted example, the top left jaw may substantially oppose axial movement in one (e.g., downward) axial direction, while the bottom left jaw may substantially oppose movement in an opposite (upward) axial direction. Accordingly, the opposing angles on the left finger may yield substantial bidirectional retention force. This may be advantageous, for example, in applications in which the gripper device holds the syringe body against movement of the plunger in both directions (e.g., plunger withdrawal for fill or charge, plunger advanced to infuse or discharge). For the right gripping finger, the contact surfaces have similar opposing angles between the top and bottom gripper jaws. In particular, the top right jaw may substantially oppose axial movement in one (e.g., upward) axial direction, while the bottom right jaw may substantially oppose movement in an opposite (downward) axial direction.

In an exemplary application in which a force applied to the plunger is substantially higher in one direction than the other, a majority (e.g., two of three gripper jaws on each gripper finger) or even all of the tapering angles of the contact surfaces for the gripper jaws may be oriented to substantially oppose motion of the syringe body in the direction of most significant force on the plunger. For example, some applications advance the plunger all the way into the barrel using a substantially low force, and then apply a substantially higher force to the plunger to draw fluid into the syringe. Accordingly, a low retention force is specified for the gripper device in the direction of advancing the plunger, and a relatively high retention force is specified in the direction of withdrawing the plunger. To maximize throughput or retention force in the direction of maximum axial force, a gripper device may be selected to have an appropriate number of gripping jaws configured with appropriate orientation of the tapering angles to provide the retention force as specified for each direction.

Some embodiments have one or more gripping jaws on each side of the item, and the number of opposing gripping jaws are the same (e.g., 3 on each side) or different (e.g., 5 on left, 4 on right).

In various examples, some or all of the gripper fingers have at least a portion of a contact surface that is substantially angled, textured, and/or finished.

In various embodiments, some or all of a contact surface for directly contacting the container to be gripped is finished (e.g., polished, coated, plated, textured, faceted, or slotted to form small teeth). By way of example, a contact surface of some embodiments is coated with a compliant material such as rubber (e.g., to distribute local contact force to minimize surface damage, and/or to increase friction to resist axial movement while the item is gripped). Some embodiments are coated with bonded abrasives, which may increase friction to oppose axial slippage of the item being gripped. In some embodiments, at least a portion of a contact surface has, for example, an anodized plating (e.g., to increase wear resistance). One or more faces in a gripper device may be textured, for example, by micropolishing. In some embodiments, at least a portion of a contact surface of a gripper finger in a gripper device is finished, for example, using electropolishing (e.g., to make the surface easy to clean). In some examples, at least a portion of a finger contact surface is machined to create a diamond knurled pattern. In some embodiments, at least a portion of a contact surface of a gripper finger is sand blasted.

In some embodiments, such as the one shown in FIG. 5, the tapered or angled contact surface may advantageously provide an edge to grip the item with a higher local pressure in a way that substantially resists movement (e.g., axial, radial, rotational) of the item. Other gripper device embodiments include a gripper finger with a substantially frictional grip using a substantially vertically oriented contact surface in combination with at least one gripper finger that has a substantially angled or tapered contact surface.

Figure 6:
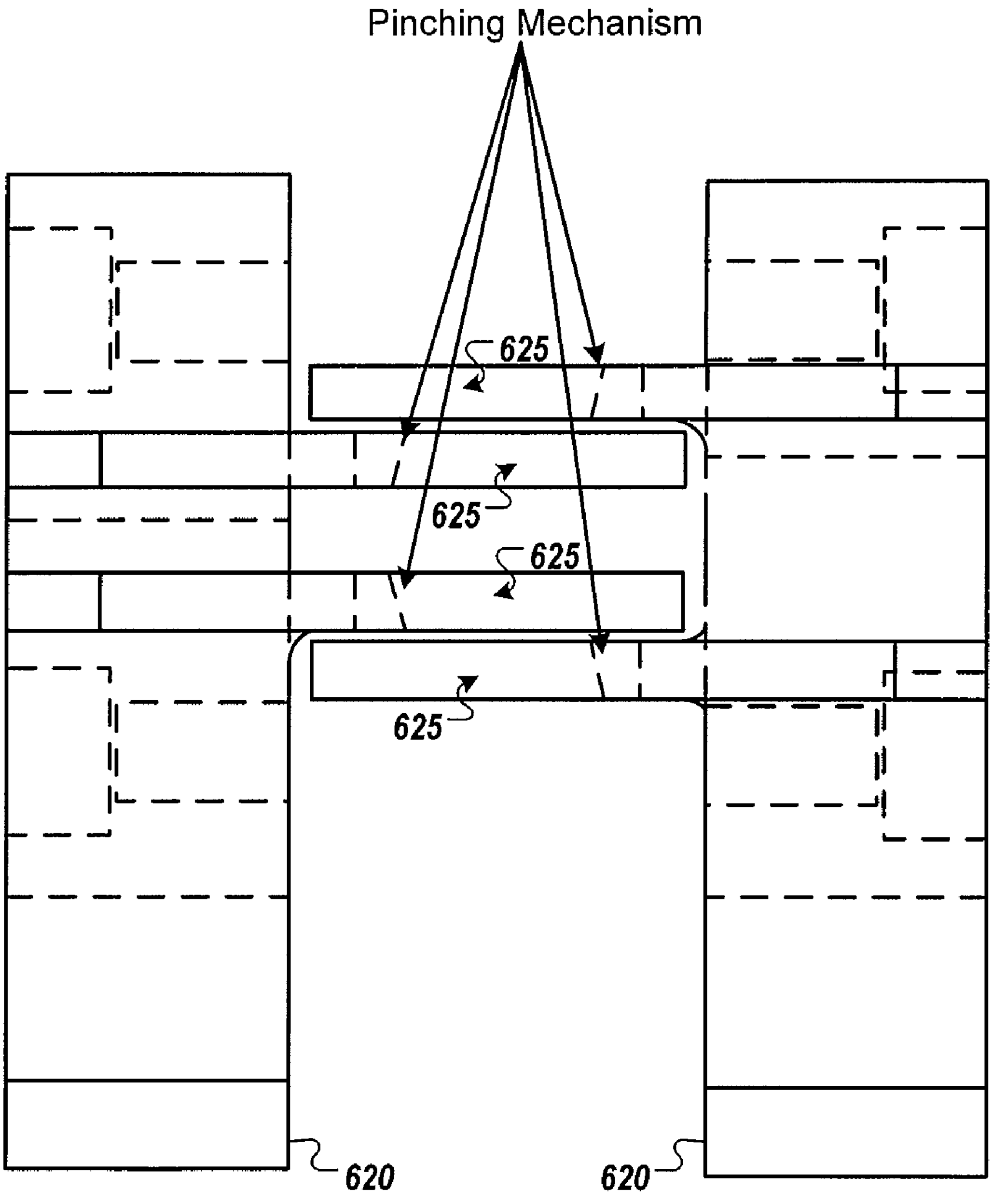
FIG. 6 shows a side cross-section view of a pair of exemplary gripper fingers with interleaved gripper jaws.

FIG. 6 shows a pair of exemplary gripper fingers 620 with interleaved gripper jaws 625. In the depicted embodiment, two gripping jaws of one gripper finger are between two gripping jaws of the other gripper finger. Each of the jaws of this example have substantially tapered or angled contact surfaces, as described above, and provide a pinching mechanism (e.g., beveled leading edges) to positively grasp an item.

Figure 7:
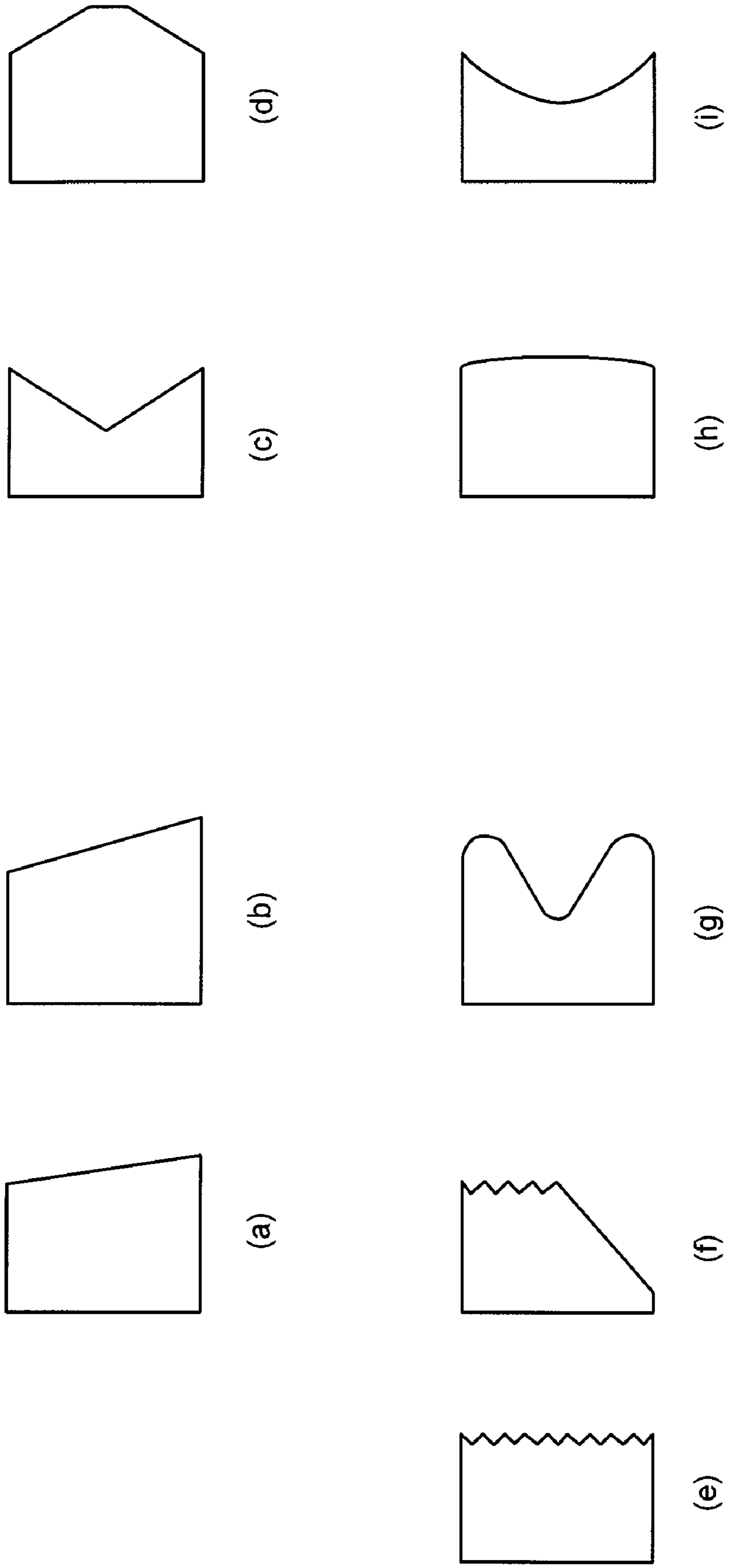
FIGS. 7(*a*)-7(*i*) show side cross-section views of various embodiments of contact surface of a gripper jaw.

FIGS. 7(*a*)-7(*i*) show side cross-section views of exemplary leading edge portions of a gripper jaw. FIGS. 7(*a*)-7(*b*) illustrate various angles of the contact surface with respect to vertical. FIGS. 7(*c*)-7(*d*) illustrate examples of contact surface profiles, FIG. 7(*c*) being concave and having two sharp contact edges to grip the item, and FIG. 7(*d*) being convex with a single blunt distal edge of substantially reduced vertical dimension than a thickness of a proximal portion of the finger so as to produce a more localized contact force. FIGS. 7(*e*)-7(*g*) illustrate examples of contact surface profiles, having various finishes and textures, as well as distribution, number and sharpness of surface contact points (e.g., teeth). FIGS. 7(*h*)-7(*i*) show further examples of contact surfaces.

Figure 8:
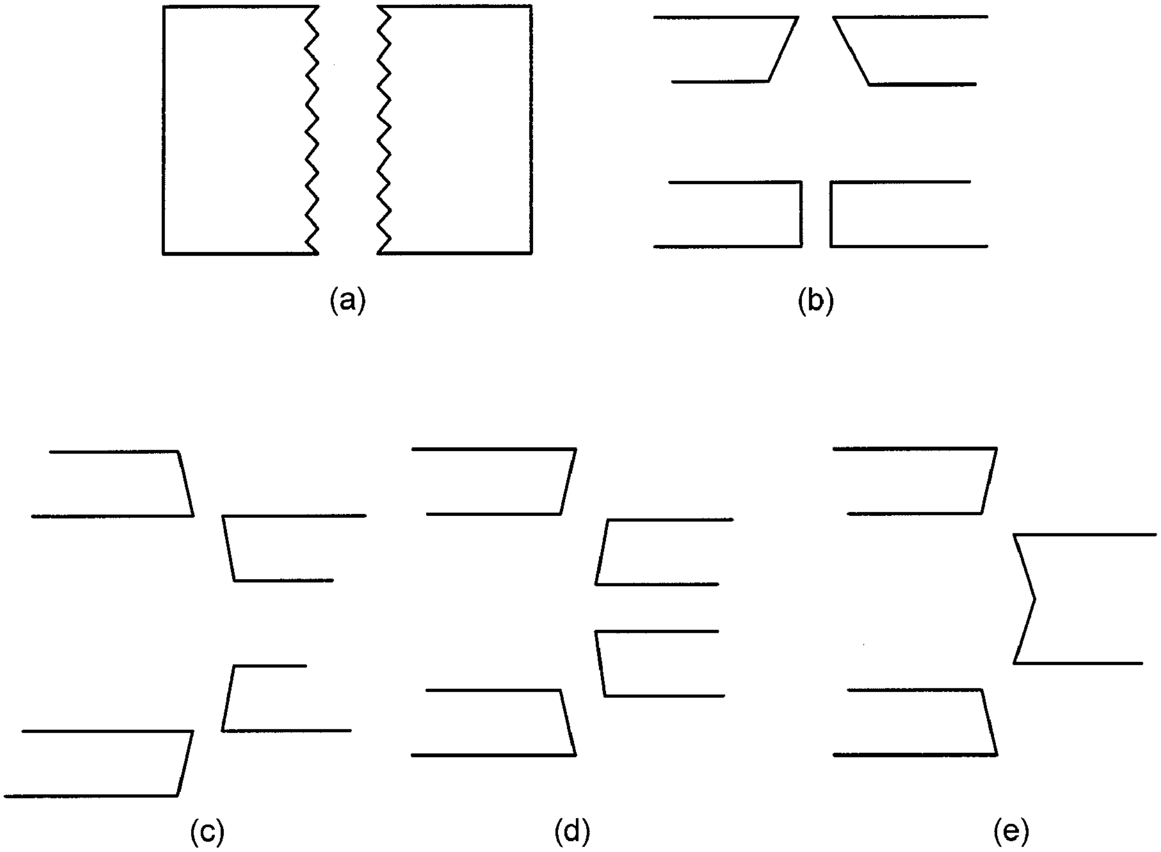
FIGS. 8(*a*)-8(*e*) show side cross-section views of various configurations of gripping jaws.

As shown in FIGS. 8(*a*)-8(*e*), various configurations of the gripper jaws are possible. The exemplary gripper jaws depicted in FIG. 8(*a*) have only one pair of opposing gripper jaws. In some embodiments, the gripping jaws of one gripper finger are oriented directly across from the gripping jaws of another gripper finger, as shown in FIG. 8(*b*), and in other embodiments, the gripper jaws of one gripping finger are substantially offset in an axial direction with respect to the gripper jaw(s) of another gripping finger, as shown in FIGS. 8(*c*)-8(*e*).

Some embodiments may include at least a portion of one or more of the gripper jaws having a substantially vertical contact surface and at least one of the gripper jaws having a substantially tapered or angled contact surface. FIG. 8(*b*) shows an exemplary gripper finger configuration with a top set of jaws having a substantially angled or tapered contact surface, and a bottom set of jaws having a substantially vertical contact surface.

FIGS. 8(*c*)-8(*e*) show exemplary configurations for the positive and negative angles of the contact surfaces of the gripper jaws.

Accordingly, a gripper finger configuration may be selected from among a wide range of options in order to suit a particular application. In addition to interleaved and non-interleaved configurations, various implementations of the gripper devices may have different axial separations of the fingers to accommodate different types of containers. Moreover, the gripper fingers may be constructed of various materials (e.g., composite, metal, plastic, glass) suitable to the application environment.

Figure 9:
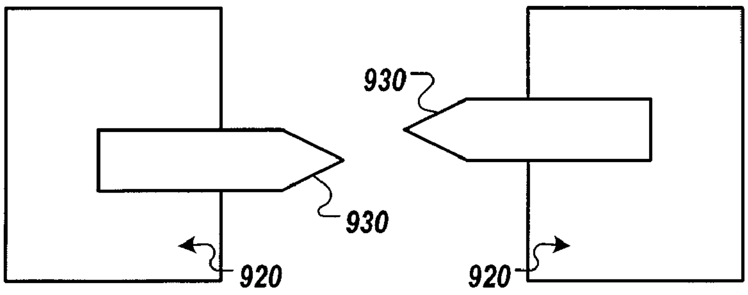
FIG. 9 shows a side cross-section view of a pair of exemplary gripper fingers with jaw inserts.

FIG. 9 shows a side cross-section view of a pair of exemplary gripper fingers 920 with jaw inserts 930. In the depicted embodiment, each finger has a single insert that may provide the sharp edge or textured surface that may be needed for enhanced grip or axial loading. In some embodiments, one or more of the fingers may use multiple jaw inserts. The inserts may be, for example, molded into the fingers, or bolted onto the fingers, or attached to the fingers with an adhesive.

One or more of the gripper finger profiles, the angle on the gripper jaw faces, and the interleaving (or non-interleaving) of gripper jaws, can be optimized to, for example, reduce distortion of specific items to be grasped for a given applied closing load. Other factors, or combinations thereof, may be optimized depending on the specific nature of the problem including, but not limited to alignment, grip force, or hand-off characteristics. The optimizations may be different for differently shaped items. In some embodiments, gripping force may be controlled in coordination with control of plunger motion profile (e.g., maximum velocity, axial force). A controller may determine an upper limit on plunger velocity based on considerations such as fluid viscosity, needle size, and the like, to substantially reduce or eliminate excess leakage around the stopper of the plunger. Another embodiment may allow the controller to alter grip force as a function of parameters that indicate the ability of the item to withstand radial and/or axial forces. Such parameters may include, for example, plunger velocity, fluid viscosity, needle diameter, item size, and item construction, or a combination of these parameters.

Two sets of experimental tests were performed using two different sets of gripper fingers to grasp the substantially smooth portion of a tubular syringe barrel (e.g., without making contact with radial features, such as tabs at the end of the barrel). All tests were performed with the test gripper fingers holding a standard 60 ml BD (Becton Dickson, model 309653) luer-lock style syringe.

The tests were first performed with a first set of gripper fingers generally as shown in FIG. 5, except with substantially flush contact surfaces (e.g., about zero angle with respect to vertical). Unlike the gripper fingers as depicted in FIG. 4, the faces of each gripper jaw of the first gripper finger set had a face separation of approximately 130 degrees.

The tests were also performed on a second gripper device configured as in the embodiment described and depicted with reference to FIGS. 4 and 5. In particular, the second embodiment had gripper fingers with angled contact surfaces (e.g., about 10 degrees with respect to vertical), and the faces of each gripper finger had a separation of approximately 90 degrees.

A first test measured a slip force at which a syringe begins to slip (e.g., move axially) while held with a specified grip force (as controlled by the current supplied to the gripper finger actuator motor). Several trials were conducted to measure the slip force while simulating pushing and pulling forces on the plunger.

The first test was performed as follows: set a syringe in the gripper fingers; apply a grip force (i.e., in the direction of plunger travel) to pull or push the syringe out of the fingers; use a force meter to measure the force when the syringe first slips in the fingers. Pull tests were performed by pulling the syringe from the plunger stem side in the direction away from the syringe luer; push tests were performed by pushing the syringe from the plunger stem side towards the syringe luer.

Note that although grip force is represented in units of current (A), this does not mean that the data for the actual test current was in Amperes. For convenience, a scale factor was used to convert the normalized data shown in Table 1 below to actual motor current. The gripper actuators used in the tests used DC servomotors, and testing showed a substantially linear relationship between the motor current and the grip force over the parameter ranges of interest. Force data indicated in units of kilograms (kg) may be scaled to units of Newtons (N) by multiplying by 9.8 (m/sec^2).

TABLE 1

| Test | First Set of Gripper Fingers: Flush contact gripper faces; 130 degrees face separation | | Second Set of Gripper Fingers: 10 degrees angled contact surface; 90 degrees face separation | |
|---|---|---|---|---|
| | Grip Force (A) | Slip Force (kg) | Grip Force (A) | Slip Force (kg) |
| Pull 1 | 2.5 | 3.2 | 2.5 | at least 9.8[(1)] |
| Pull 2 | 2.5 | 3.1 | 2.5 | at least 11.1[(1)] |
| Pull 3 | 2.5 | 3.2 | 2.5 | at least 18[(1)] |
| Pull 4 | | | 1.5 | 15 |
| Pull 5 | | | 1.5 | 19 |
| Push 1 | 2.5 | 2.4 | 1.5 | 14 |
| Push 2 | 2.5 | 2.4 | 1.5 | 14.5 |
| Push 3 | 2.5 | 2.4 | 1 | 11 |

[(1)]String broke on these test trials, so actual slip force may be higher. Tests were discontinued, having demonstrated at least a three fold increase in resistance to slip compared to the first set of gripper fingers.

Local deformation of the syringe (e.g., due to radial force) may account for at least some of the differences in slip forces between pushing and pulling. In particular, the syringe barrel diameter decreases from the open end to the tab end.

The results of pulls 1-3 of the first test show, for example, that for pull tests using the same grip force (2.5 A motor current), the second set of gripper fingers provides a substantially higher slip force than the first set of gripper fingers by a factor of at least about two or three times.

The results of pull trials 4-5 show that at a reduced grip force (1.5 A motor current), the second set of gripper fingers provides a substantially higher slip force than the first set of gripper fingers at a higher grip force (2.5 A motor current) by a factor of at least about 3 to about 5.

In the test equipment used, grip force is a substantially linear function of motor current. As such, ratios of slip force to grip force (here represented by motor current) may be compared as between the first and second sets of gripper fingers. For the first set of gripper fingers, the ratio of slip force to grip force is about 1.28 (kg/A) for pulling, and about 0.96 (kg/A) for pushing. For the second set of gripper fingers, the ratio of slip force to grip force is about at least 3.9 (kg/A) at high grip force (2.5 A motor current) and at least about 9.3 (kg/A) at low grip force (1.5 A motor current) for pulling, and about 9.3 (kg/A) at low grip force (1.5 A motor current) and about 11 (kg/A) at a further reduced grip force (1 A motor current) for pushing.

As a relative comparison, the data shows that the second set of gripper fingers exhibits substantially higher ratios of slip force to grip force for both pulling and gripping. For example, the measured data shows that ratios of slip force to grip force when pulling is more than twice, such as at least three times higher for the second set of gripper fingers than for the first set of gripper fingers. Discounting pull trials 1-3, in which the pulling string broke, the data indicates that ratios of slip force to grip force when pulling are more than seven times higher for the second set of gripper fingers than for the first set of gripper fingers.

The measured data also indicates higher ratios of slip force to grip force in the second set of gripper fingers when pushing forces were applied to the syringe. The measured data shows that ratios of slip force to grip force when pushing are more than nine times higher for the second set of gripper fingers than for the first set of gripper fingers.

A second test measured deformation at a number of positions along the barrel of the syringe when the gripper fingers applied a grip force to hold the barrel.

The second test was performed as follows: set a syringe in the gripper fingers; apply a motor current to produce a corresponding grip force; measure deformation at specified positions, both parallel to and orthogonal to the grip force, along the length of the barrel.

Note that grip force is in the direction that the gripper fingers move radially to grasp the barrel. Nominal barrel diameter (with zero applied force) is 29.40 mm. In Table 2 below, deformation dimensions are shown in parentheses.

TABLE 2

| Distance From Gripper | First Set of Gripper Fingers: Flush contact gripper faces, shallow grip angle | | | Second Set of Gripper Fingers: 10 degrees knife edge gripper faces, 90 degrees grip angle | |
|---|---|---|---|---|---|
| Face (ml - markings on syringe) | Grip Force (A) | Barrel Size Parallel to Grip Force (mm) | Barrel Size Perpendicular to Grip Force (mm) | Grip Force (A) | Barrel Size Parallel to Grip Force (mm)[(1)] |
| 14 | 2.5 | 29.24 (0.16) | 29.89 (0.49) | 1.5 | 29.42 (0.02) |
| 4 | 2.5 | 28.9 (0.5) | 30.06 (0.66) | 1.5 | 29.43 (0.03) |
| 0 | 2.5 | 28.58 (0.82) | 30.18 (0.78) | 1.5 | 29.39 (0.01) |
| −2 | 2.5 | 28.57 (0.83) | Can't measure | 1.5 | 29.39 (0.01) |
| −4 | 2.5 | 28.57 (0.83) | Can't measure | | |

[(1)]Perpendicular measurements were not measured since there was substantially no appreciable deformation. Moreover, with the 90 degrees grip angle used in the second set of gripper fingers, the forces are applied substantially symmetrically around the syringe (e.g., perpendicular measurements would be substantially similar to parallel measurements).

The measurements along the barrel show that at a reduced grip force (1.5 A motor current), the second set of gripper fingers deformed the barrel substantially less than the first set of gripper fingers at a higher grip force (2.5 A motor current). From the first test (described above), the second set of gripper fingers exhibited substantially higher resistance to slipping despite the reduced motor current.

In particular, when operated to produce substantially higher slip resistance (at 1.5 A motor current), the measured data indicates that the second set of gripper fingers caused substantially less deformation than the first set of gripper fingers (at 2.5 A motor current) in the parallel-to-grip dimension. The reduced deformation was as follows: over about 87.5% less at 14 ml; about 94% less at 4 ml; and about 98.7% less at 0 ml and at −2 ml.

In one aspect, the data from the first and second tests indicate that the second set of gripper fingers can produce, at least at one operating condition (e.g., 1.5 A motor current), substantially less deformation (e.g., over 85% less) of the barrel while providing substantially increased slip resistance (e.g., by a factor of at least 3) compared to the first set of gripper fingers operated at a higher motor current (2.5 A motor current).

The measured data indicate that even with reduced grip force, the second set of gripper fingers provides substantially increased resistance to slip in both (e.g., pulling and pushing) directions, while producing a substantially reduced deformation of the syringe barrel.

Accordingly, some embodiments, such as the second set of gripper fingers, provide substantially increased slip resistance while causing substantially reduced barrel deformation and while operating with substantially less actuator motor current.

Some exemplary gripper devices include multiple actuators. For example, one gripper finger on each side can be operated independently to grasp items. In another embodiment, a gripper device includes a single fixed finger with one actuator to control an opposing finger.

In some other implementations, a gripper finger includes an air path with at least one aperture near the contact face (e.g., either directly on the face, on top of the gripper, underneath the gripper) that would allow either pressure or suction to be applied to the region around the contact surface of the finger. With suction applied through a conduit to the aperture or apertures, improved gripping may be achieved, while maintaining or reducing the grip force required by a mechanical actuator to the gripper finger and controlling aerosols or other matter present during the fluid transfer process. In another example, a fluid is expelled or under pressure to exit the apertures(s), for example, to aid or improve processing. This fluid could be a gas (e.g., air, nitrogen), or liquid (water, oil, alcohol or solvent), which is at a controlled temperature and/or pressure. In one example, such fluid control may help control (e.g., remove, aspirate, exhaust, chemically neutralize, dilute, clean, or the like) aerosols or other matter present during the fluid transfer process.

In various implementations, methods for controlling a gripper device include force feedback, which may be detected using, for example current and/or voltage sensing. Some other embodiments may incorporate mechanical pressure (e.g., spring deflection) sensors, pressure sensors (e.g., strain gauges), piezo-electric type pressure sensing to generate force feedback signals. In some implementations, precise position and/or velocity control complement and/or substitute for force sensing. Position and/or velocity sensing may be performed, for example, using an optical encoder (e.g., linear or rotational) to monitor a drive train (e.g., shaft) that couples to an actuator part of the gripper device.

Some implementations may be controlled, at least in part, using a motor or shaft torque sensing scheme, for example, by monitoring motor current to drive the actuator. For example, torque, speed, position, and/or force limits may be placed on the actuator motion profile to close and grasp a container (e.g., syringe). In some applications, a torque profile may be established to provide an upper torque limit during a closing (e.g., grip a syringe barrel) operation, during a holding (e.g., maintain grip of syringe) operation, and during an opening (e.g., release) operation. A brake mechanism may also be present that effectively stops and/or holds a position of the actuator, thereby allowing motor current to be reduced, minimizing temperature rise, and improving overall actuator life.

In various implementations, a memory stores parameter information for controlling the operation of a gripping device. For example, some stored parameter information relates to a container type, size, material, outer diameter (with dimensional tolerance parameters). In some embodiments, stored information may include motion profile parameters for controlling the actuation of the gripper device. Examples of motion profile parameters may include, but are not limited to, thresholds and/or limits for maximum, minimum, and time rate of change for torque, force, position, and/or speed at various time intervals of a motion profile. Current, force, pressure, position, and/or velocity sensors, either singly or in combination, may be used to provide a feedback signal to the motion controller.

In some embodiments, user input defines motion profiles, for example, based on empirical testing to determine suitable gripping force values for various application conditions. In some embodiments, profile data for various types of containers updates electronically through a network connection, or is read from a data storage device (e.g., disc drive, memory stick, read-only memory, or the like). In some implementations, one or more motion profile parameters are dynamically determined, for example, based on mechanical information about a container to be gripped. For example, a processor executes instructions to calculate an appropriate gripping force level based on container characteristics (e.g., hardness, stress limits, area of contact) and/or container material type (e.g., plastic, glass, metal, rubber, polymer or the like).

In some embodiments, the plunger pulling force and/or plunger movement rate is modified according to the gripping force capability of the gripper device for a particular container. For a particular gripping force, the gripping device is controlled to provide appropriate grip (e.g., at a controlled force, gripper position, or pressure) such that a gripped syringe will not move axially over a range of plunger axial movement within the barrel of the syringe. The axial force on the barrel associated with plunger movement depends, for example, on the plunger velocity, position (e.g., if at an end stop), fluid content (e.g., if compressible fluids, such as air, are in the syringe fluid stream), fluid composition (e.g., fluid flow characteristics), fluid path characteristics (e.g., needle size), as well as other factors, such as atmospheric pressure.

In some implementations, a feedback control is used to dynamically and automatically determine, record, tune, and/or adjust gripper force level and/or position for gripping a particular container. For example, a test syringe is gripped at a first force level during a withdrawal operation of syringe plunger to draw a specified fluid into the barrel. Tests are performed automatically at various conditions (e.g., gripper force, plunger velocity profile, fluid characteristics) to determine limits beyond which substantial misoperation (e.g., air leakage around plunger, excess force on container side wall) is detected. A tuning operation is performed by running a user-specified or statistically significant number of test trials to identify reliable operating parameters for the gripping and/or plunger motion profiles. The determined parameters are stored in a memory device for recall during operation of an APAS system, for example. The stored parameters are updated to a motion controller processor during operation of an APAS to maximize throughput for compounding operations that use various containers. Some embodiments may advantageously provide substantially reduced or eliminated leakage or breakage, for example, during compounding operations.

To provide for maintenance, protection, and/or reduced cross-contamination via gripper devices, a temporary or sacrificial layer may be applied in some implementations over the gripper fingers during some operations (e.g., operations involving chemotherapy preparations). In one embodiment, a shaped compliant jacket such as rubber or latex may be adapted to slip onto at least a portion of a gripper finger (e.g., like a glove). The temporary layer is readily removed or replaced when performing operations with other compounds. Accordingly, such temporary layers reduce the potential for residue on the gripper fingers to cross-contaminate subsequent operations. Such removable layers may advantageously reduce the burden of cleaning the gripper fingers between different operations.

A number of embodiments have been described. Nevertheless, it will be understood that various modifications may be made. For example, advantageous results may be achieved if the steps of the disclosed techniques were performed in a different sequence, if components in the disclosed systems were combined in a different manner, or if the components were replaced or supplemented by other components. The functions and processes (including algorithms) may be performed in hardware, software, or a combination thereof. Accordingly, other embodiments are within the scope of the disclosure.

What is claimed is:

1. An automated pharmacy admixture system, comprising:
- a supply of a plurality of different types of medical containers, said plurality of different types of medical containers comprising items selected from the group consisting of syringes, IV bags, and vials;
- a compounding system disposed in a substantially aseptic chamber to transfer medicaments between medical containers;
- a robotic manipulator system to transport medical containers within the substantially aseptic chamber; and
- a gripper device for handling a syringe having a barrel within the substantially aseptic chamber, the gripper device comprising:
  - a pair of gripper fingers, each gripper finger comprising a first jaw, the first jaw comprising a recess to grasp the syringe barrel, the recess comprising a first tapered contact surface having a leading edge to contact the syringe barrel, wherein the first tapered contact surface is disposed at an angle with respect to a longitudinal axis of the syringe barrel when the gripper fingers are in contact with the syringe barrel; and
  - an actuator to engage the gripper fingers to grasp the syringe barrel based on inputted or stored motion profile parameters, wherein the gripper fingers provide a ratio of slip force to grip force at least about three times greater than gripper fingers with an untapered contact surface.

2. The system of claim 1, wherein the gripper device is coupled to the robotic manipulator system.

3. The system of claim 1, wherein the gripper device is coupled to a syringe manipulator station.

4. The system of claim 1, wherein the gripper device is configured to handle different sizes or shapes of syringes.

5. The system of claim 1, wherein the tapered contact surface is curved.

6. The system of claim 1, wherein the contact surface is tapered at an angle between about 10 degrees to about 80 degrees.

7. The system of claim 1, wherein the contact surface is tapered at an angle between about 30 degrees to about 60 degrees.

8. The system of claim 1, wherein the recess comprises a second tapered contact surface having a leading edge to contact the syringe barrel, wherein the second tapered contact surface is disposed at an angle with respect to the longitudinal axis of the syringe barrel when the gripper fingers are in contact with the syringe barrel.

9. The system of claim 8, wherein the first and second tapered contact surfaces converge approximate at their leading edges.

10. The system of claim 8, wherein the first and second tapered contact surfaces converge distal to their leading edges.

11. The system of claim 1, wherein the recess comprises a plurality of tapered contact surfaces that form a saw tooth pattern.

12. The system of claim 1, wherein the gripper fingers provide a ratio of slip force to grip force at least about six times greater than gripper fingers with an untapered contact surface.

13. The system of claim 1, wherein the gripper fingers provide a reduction in syringe deformation per unit grip force by at least about 75 percent relative to gripper fingers with an untapered contact surface.

14. The system of claim 1, wherein the gripper fingers provide a reduction in syringe deformation per unit grip force by at least about 90 percent relative to gripper fingers with an untapered contact surface.

15. The system of claim 1, where the gripper fingers are releasably coupled to the gripper device.

16. The system of claim 1, wherein each gripper finger comprises a second jaw that has an opposed tapering angle relative to the first jaw.

17. The system of claim 1, wherein the jaws are interleaved with one another when the jaws are in operative positions.

18. The system of claim 1, wherein the gripper device further comprises a feedback sensor to measure gripping force.

19. The system of claim 1, wherein the gripper device further comprises a sensor to detect gripper finger position.

20. The system of claim 1, wherein a pressure in the substantially aseptic chamber is regulated to a pressure level that is substantially above ambient pressure.

21. The system of claim 1, further comprising:
- a supply of gripper fingers with different configurations for processing different medical containers with different types of medicaments.

22. The system of claim 1, further comprising:
- an air handling system to provide substantially laminar air flow within the substantially aseptic chamber.

23. The system of claim 1, further comprising:
- a UV sanitization system to sanitize medical containers.

24. An automated pharmacy admixture system, comprising:
- inventory means for supplying a plurality of different types of medical containers, said plurality of different types of medical containers comprising items selected from the group consisting of syringes, IV bags, and vials; compounding means disposed in a substantially aseptic chamber for transferring medicaments between medical containers;
- manipulating means for transporting medical containers within the substantially aseptic chamber; and
- gripping means for handling a syringe having a barrel within the substantially aseptic chamber, said gripping means comprising:
  - a pair of grasping means for grasping the syringe barrel, each grasp means comprising a tapered contact surface having a leading edge to contact the syringe barrel, wherein the tapered contact surface is disposed at an angle with respect to a longitudinal axis of the syringe barrel when the pair of grasping means are in contact with the syringe barrel; and actuating means for engaging the pair of grasping means to grasp the syringe barrel based on inputted or stored motion profile parameters, wherein the pair of grasping means provide a ratio of slip force to grip force at least about three times greater than a pair of grasping means with an untapered contact surface.

25. A gripper device for handling a syringe having a barrel, comprising:

a pair of gripper fingers, each gripper finger comprising a first jaw, the first jaw comprising a recess to grasp the syringe barrel, the recess comprising a first tapered contact surface having a leading edge to contact the syringe barrel, wherein the first tapered contact surface is disposed at an angle with respect to a longitudinal axis of the syringe barrel when the gripper fingers are in contact with the syringe barrel; and an actuator to engage the gripper fingers to grasp the syringe barrel based on inputted or stored motion profile parameters, wherein the gripper fingers provide a ratio of slip force to grip force at least about three times greater than gripper fingers with an untapered contact surface.

26. The system of claim 1, wherein a pressure in the substantially aseptic chamber is regulated to a pressure level that is substantially below ambient pressure.

* * * * *